United States Patent
Liu et al.

(10) Patent No.: US 10,165,180 B2
(45) Date of Patent: Dec. 25, 2018

(54) DYNAMIC DEPLOYMENT OF EXECUTABLE RECOGNITION RESOURCES IN DISTRIBUTED CAMERA DEVICES

(71) Applicant: Cisco Technology, Inc., San Jose, CA (US)

(72) Inventors: Hao Liu, Beijing (CN); Dawei Tang, Shanghai (CN); Yuliang Du, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 89 days.

(21) Appl. No.: 15/248,088

(22) Filed: Aug. 26, 2016

(65) Prior Publication Data
US 2018/0063422 A1    Mar. 1, 2018

(51) Int. Cl.
*H04N 5/232*    (2006.01)
*H04N 5/247*    (2006.01)

(52) U.S. Cl.
CPC ..... *H04N 5/23225* (2013.01); *H04N 5/23206* (2013.01); *H04N 5/247* (2013.01)

(58) Field of Classification Search
CPC ........... H04N 5/23225; H04N 5/23245; H04N 5/247; H04N 5/23248; H04N 5/23203; H04N 5/23222
See application file for complete search history.

(56) References Cited

U.S. PATENT DOCUMENTS

| 6,711,293 | B1 | 3/2004 | Lowe | |
|---|---|---|---|---|
| 8,060,617 | B2 | 11/2011 | Moon | |
| 8,488,001 | B2 * | 7/2013 | Mohanty | H04N 7/181 348/143 |
| 8,619,140 | B2 * | 12/2013 | Brown | G01S 3/7865 348/154 |
| 9,077,887 | B2 * | 7/2015 | Kim | H04N 5/23225 |
| 2002/0180960 | A1 * | 12/2002 | Koren | G01N 21/8803 356/237.2 |
| 2006/0203090 | A1 * | 9/2006 | Wang | G06K 9/209 348/143 |
| 2008/0049116 | A1 * | 2/2008 | Tojima | H04N 5/232 348/222.1 |
| 2009/0232020 | A1 * | 9/2009 | Baalbergen | H04L 12/2809 370/254 |
| 2009/0238460 | A1 | 9/2009 | Funayama et al. | |

(Continued)

OTHER PUBLICATIONS

Yang et al., U.S. Appl. No. 15/190,798, filed Jun. 23, 2016.

(Continued)

*Primary Examiner* — Timothy J Henn

(74) *Attorney, Agent, or Firm* — Leon R. Turkevich

(57) ABSTRACT

In one embodiment, a method comprises: identifying a deployment context for execution within one or more distributed camera devices in a distributed camera system, the deployment context including video recognition requirements relative to available capacity in the one or more distributed camera devices; determining an optimized executable recognition resource for the deployment context from available executable recognition resources; and sending, to the one or more distributed camera devices, an instruction for deployment and execution of the optimized executable recognition resource for optimized recognition according to the deployment context.

20 Claims, 6 Drawing Sheets

(56) References Cited

U.S. PATENT DOCUMENTS

| | | | |
|---|---|---|---|
| 2015/0181460 A1 | 6/2015 | Subramanian et al. | |
| 2015/0200872 A1 | 7/2015 | Huang et al. | |
| 2015/0207977 A1* | 7/2015 | Cho .................. | H04N 5/23206 348/207.11 |
| 2015/0249586 A1 | 9/2015 | Byers et al. | |
| 2015/0317835 A1 | 11/2015 | Byers | |
| 2015/0334295 A1* | 11/2015 | Hinkel ............... | H04N 5/23209 348/222.1 |

OTHER PUBLICATIONS

Niimmagadda et al., "Real-time Moving Object Recognition and Tracking Using Computation Offloading", The 2010 IEEE/RSJ International Conference on Intelligent Robots and Systems, Oct. 18-22, 2010, Taipei, Taiwan, pp. 2449-2455.

Zhang et al., "To offload or not to offload: an efficient code partition algorithm for mobile cloud computing", 2012 IEEE 1st International Conference on Cloud Networking (CLOUDNET), pp. 80-86.

Camillo, "Multiple Cameras, One Controller", Assembly Magazine, [online], Apr. 2, 2012, [retrieved on Mar. 5, 2016]. Retrieved from the Internet: URL: <http://www.assemblymag.com/articles/89945-multiple-cameras-one-controller>, 5 pages.

"DSLR Remote Pro Multi-Camera", Breeze Systems, [online], 2015, [retrieved on Mar. 5, 2016]. Retrieved from the Internet: URL: <http://breezesys.com/MultiCamera/>, 3 pages.

"Brickstream LIVE by Nomi", [online], [retrieved on Mar. 5, 2016]. Retrieved from the Internet: URL: <http://www.nomi.com/sensors/brickstream-live/>, 4 pages.

"Cisco Video Surveillance 6000 Series IP Cameras", [online], [retrieved on Mar. 5, 2016]. Retrieved from the Internet: URL: <http://www.cisco.com/c/en/us/products/physical-security/video-surveillance-6000-series-ip-cameras/index.html>, 2 pages.

"Rackbuilder—Customize Your Production Unit", Datavideo Technologies Co., [online], 2016, [retrieved on Mar. 5, 2016]. Retrieved from the Internet: URL: <http://www.datavideo.com/>, 4 pages.

Senior et al., "Video analytics for retail", [online], [retrieved on Jul. 14, 2016]. Retrieved from the Internet: URL: <http://rogerioferis.com/publications/FerisAVSSO7b.pdf>, 6 pages.

Lane et al., "Can Deep Learning Revolutionize Mobile Sensing?", 16th Workshop on Mobile Computing Systems and Applications (HotMobile '15), [online], Feb. 2015, [retrieved on Mar. 5, 2016]. Retrieved from the Internet: URL: <http://www.enigmahub.com/sites/default/files/lane_hotmobile15.pdf>, 6 pages.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Wikipedia, "Scale-invariant feature transform", [online], Feb. 27, 2016, [retrieved on Mar. 5, 2016]. Retrieved from the Internet: URL: <https://en.wikipedia.org/w/index.php?title=Scale-invariant_feature_transform&printable=yes> pp. 1-16.

Wikipedia, "Speeded up robust features", [online], Feb. 19, 2016, [retrieved on Mar. 5, 2016], Retrieved from the Internet: URL: <https://en.wikipedia.org/w/index.php?title=Speeded_up_robust_features&printable=yes>, pp. 1-5.

* cited by examiner

DYNAMIC DEPLOYMENT OF EXECUTABLE RECOGNITION RESOURCES IN DISTRIBUTED CAMERA DEVICES

TECHNICAL FIELD

The present disclosure generally relates to dynamic deployment of executable recognition resources in distributed camera devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Video-based analytics can be used for identifying various features and objects from images captured by cameras. Such video-based analytics can be used for different video recognition applications (i.e., recognition uses), for example monitoring manufacturing processes along a production line in a factory, video surveillance such as trespass monitoring, in-store shopper behavior monitoring, stadium security, crisis detection (e.g., fire, flood, theft, personal injury, earthquake, etc.), vehicle traffic monitoring, wildlife monitoring, etc. Different executable recognition resources have been developed to provide improved video-based analytics for the different video recognition applications; for example, Scale-Invariant Feature Transform (SIFT) is an executable recognition resource optimized for highly-accurate feature detection, but suffers from slow performance relative to the Speeded-Up Robust Features (SURF) executable recognition resource, which is much faster than SIFT but suffers from less accuracy than SIFT.

A camera device can be installed with one particular executable recognition resource, typically during manufacture of the camera device, or based on manual installation of the particular executable recognition resource during deployment of the camera device. The installed executable recognition resource, however, may be sub-optimal or inadequate for a particular video recognition application (i.e., recognition use) encountered by the camera device at a particular moment in time.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
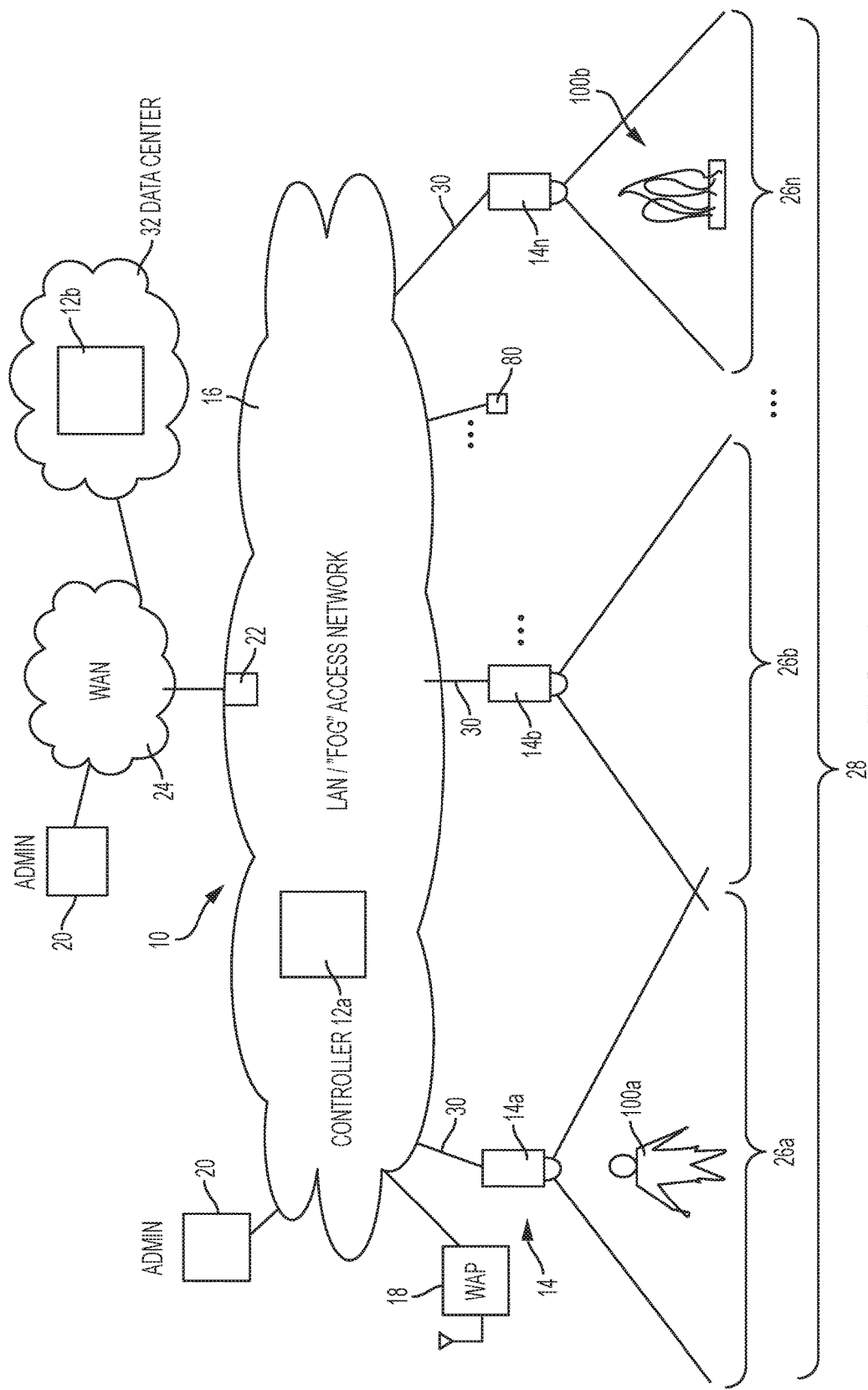
FIG. 1 illustrates an example system having an apparatus for dynamic deployment of an optimized recognition deployment strategy, including dynamic deployment of executable recognition resources in distributed camera devices, according to an example embodiment.

In one embodiment, a method comprises: identifying a deployment context for execution within one or more distributed camera devices in a distributed camera system, the deployment context including video recognition requirements relative to available capacity in the one or more distributed camera devices; determining an optimized executable recognition resource for the deployment context from available executable recognition resources; and sending, to the one or more distributed camera devices, an instruction for deployment and execution of the optimized executable recognition resource for optimized recognition according to the deployment context.

In another embodiment, an apparatus comprises a processor circuit and a device interface circuit. The processor circuit is configured for identifying a deployment context for execution within one or more distributed camera devices in a distributed camera system, the deployment context including video recognition requirements relative to available capacity in the one or more distributed camera devices. The processor circuit further is configured for determining an optimized executable recognition resource for the deployment context from available executable recognition resources. The device interface circuit is configured for sending, to the one or more distributed camera devices, an instruction for deployment and execution of the optimized executable recognition resource for optimized recognition according to the deployment context.

In another embodiment, one or more non-transitory tangible media encoded with logic for execution by a machine and when executed by the machine operable for: identifying, by the machine, a deployment context for execution within one or more distributed camera devices in a distributed camera system, the deployment context including video recognition requirements relative to available capacity in the one or more distributed camera devices; determining an optimized executable recognition resource for the deployment context from available executable recognition resources; and sending, to the one or more distributed camera devices, an instruction for deployment and execution of the optimized executable recognition resource for optimized recognition according to the deployment context.

Detailed Description

Particular embodiments enable dynamic deployment of an optimized recognition deployment strategy for optimized recognition in various video recognition applications, based on determining an optimized executable recognition resource relative to an identified deployment context, and sending to one or more distributed camera devices an instruction for deployment and execution of the optimized executable recognition resource for the identified deployment context. Since the deployment context can change over time due to the need for different video recognition applications at different times, and/or changes in available capacity in the distributed camera devices, the example embodiments can change the executable recognition resource to be used in response to the change in the deployment context.

Hence, the example embodiments can determine an optimized executable application resource, from among available executable recognition resources, that is optimized for a particular identified deployment context; the identified deployment context can include video recognition requirements for a particular video recognition application (i.e., recognition use) that begins at a particular event in time (e.g., a present or future event), relative to the available capacity in the one or more distributed camera devices for the corresponding event in time. Consequently, the example embodiments can determine the executable recognition resource providing a "best match" for the identified deployment context, namely the video recognition requirements beginning at a particular event in time relative to the available capacity in the distributed camera devices deployed at the location of the video recognition application.

Hence, the example embodiments enable dynamic deployment of an optimized executable recognition resource according to the deployment context at a particular event in time (for a particular video application given available capacity in the distributed camera devices); the example embodiments also can determine a second optimized executable recognition resource for dynamic deployment and execution for optimized recognition for a different deployment context, enabling the camera devices to change or "switch" to different executable resources for different deployment contexts (e.g., different video recognition applications and/or changes in available capacity in the camera devices). The example embodiments also enable dynamic deployment of sharing policies between the distributed camera devices, enabling the distributed camera devices to initiate and execute sensor sharing, feature sharing, model sharing, etc., for distributed processing of the video recognition application.

Hence, the example embodiments can determine and deploy the best recognition deployment strategy, which can include one or more optimized executable recognition resources for one or more distributed camera devices, and different sharing policies (e.g., sensor sharing policy, feature sharing policy, model sharing policy, etc.).

FIG. 1 is a diagram illustrating an example data network 10 implemented as a distributed camera system and configured for dynamic deployment of an optimized recognition deployment strategy, according to an example embodiment. The distributed camera system 10 comprises an apparatus 12 (e.g., 12a, 12b) operating as a controller device for the distributed camera system 10, a plurality of distributed camera devices 14, and a wired or wireless local area network (or access network) 16. The distributed camera system 10 also can include one or more wireless access points (WAP) 18 providing wireless access to wireless network devices, a client device 20 for use by an administrator of the distributed camera system 10, and a router device 22 providing reachability to a remote destination (e.g., 12b) via a wide area network (e.g., the Internet) 24.

Each apparatus 12, 14, 18, 20, and 22 is a physical machine (i.e., a hardware device) configured for implementing network communications with other physical machines via the data network 10 and/or 24. The term "configured for" or "configured to" as used herein with respect to a specified operation refers to a device and/or machine that is physically constructed and arranged to perform the specified operation. Hence, each apparatus 12, 14, 18, 20, and 22 is a network-enabled machine implementing network communications via the data network 10 and/or 24.

The distributed camera devices 14 can be physically deployed (e.g., physically mounted or positioned) at a fixed or movable locations for monitoring at respective detection zones 26 of a detection region 28; for example, the distributed camera device 14a can be physically deployed for monitoring the detection zone 26a, the distributed camera device 14b can be physically deployed for monitoring the detection zone 26b, etc., and the distributed camera device 14n can be physically deployed for monitoring the detection zone 26n. Depending on deployment, the distributed camera devices 14 can be physically deployed for providing overlapping and/or non-overlapping detection zones 26. The distributed camera devices 14 can be physically mounted at fixed locations in a fixed detection region 28, for example within a manufacturing facility, along roadways/walkways, etc. of a populated area such as a sports stadium, a corporate or educational campus, etc.; the distributed camera devices 14 also can be portable, for example carried by one or more users or mounted on movable vehicles (e.g., unmanned aerial vehicles, i.e., "drones") that execute coordinated movement (e.g., "swarming") to provide monitoring of a remote (or movable) detection region 28 that is reachable by the movable vehicles; in this example, the access network 16 can be implemented based on the distributed camera devices 14 (and/or associated movable vehicles) participating in implementation of a prescribed wireless ad hoc protocol (MANET), for example Routing Protocol for Low Power and Lossy Networks (RPL) as described in the Internet Engineering Task Force (IETF) Request for Comments (RFC) 6550.

Regardless of implementation, the controller device 12 (e.g., 12a and/or 12b) can send an instruction to each distributed camera device 14, via a corresponding controller-camera data link 30 (e.g., via a wired, wireless, or virtualized connection), for dynamic deployment of an optimum deployment strategy for a particular identified deployment context. Hence, each distributed camera device 14 can adaptively execute different executable recognition resources for different video data inputs based on the current deployment context.

As described in further detail below, the controller device 12 can be implemented either in a local apparatus 12a that is "locally" reachable at the access network 16 (e.g., as part of an access network or local area network) if high performance or low latency is required; in one example, the controller device 12a and the distributed camera devices 14 can be implemented within the access network 16 as part of a "fog computing network" providing geographically-distributed compute, storage, and networking services within an access network. Fog computing can provide a virtualized platform that provides compute, storage, and networking services within the link-layer local area network/access network 16 between end devices and cloud-based data centers 32 configured for providing cloud computing services. The geographic distribution of fog computing enables new services and applications, for example delivering high quality streaming to different endpoint devices, improved mobility support, improved support for wireless sensor networks, etc., or in this example dynamic deployment of an optimized deployment strategy based on a locally-detectable deployment context, with minimal latency. Fog computing provides for benefits such as performance, latency, security, network bandwidth, and reliability.

Alternately, the controller device 12 can be implemented in a remote computing device 12b, for example within a remote data network such as a data center (DC) 32 providing virtualized compute, storage, and network services via a wide area network 24, if the controller device 12 can provide sufficient performance for dynamic deployment of an optimized recognition deployment strategy, including at least one or more optimized executable recognition resources for one or more distributed camera devices. In the example of implementing a remote computing device 12b, the corresponding client device 20' also can be reachable via the wide area network 24.

As described in further detail below, the controller device 12 can send instructions to each distributed camera device 14 (or at least one distributed camera device 14) for dynamic deployment of an optimized recognition deployment strategy, without any manual intervention or user intervention at any of the distributed camera devices 14. Hence, the instructions sent by the controller device 12 enable dynamic and automated deployment in any one or more of the distributed camera devices 14 of the optimized recognition deployment strategy, including at least an optimized executable recognition resource, for optimized recognition according to a deployment context under control of the controller device 12 (i.e., without any manual operation of any of the distributed camera devices 14).

Figure 2:
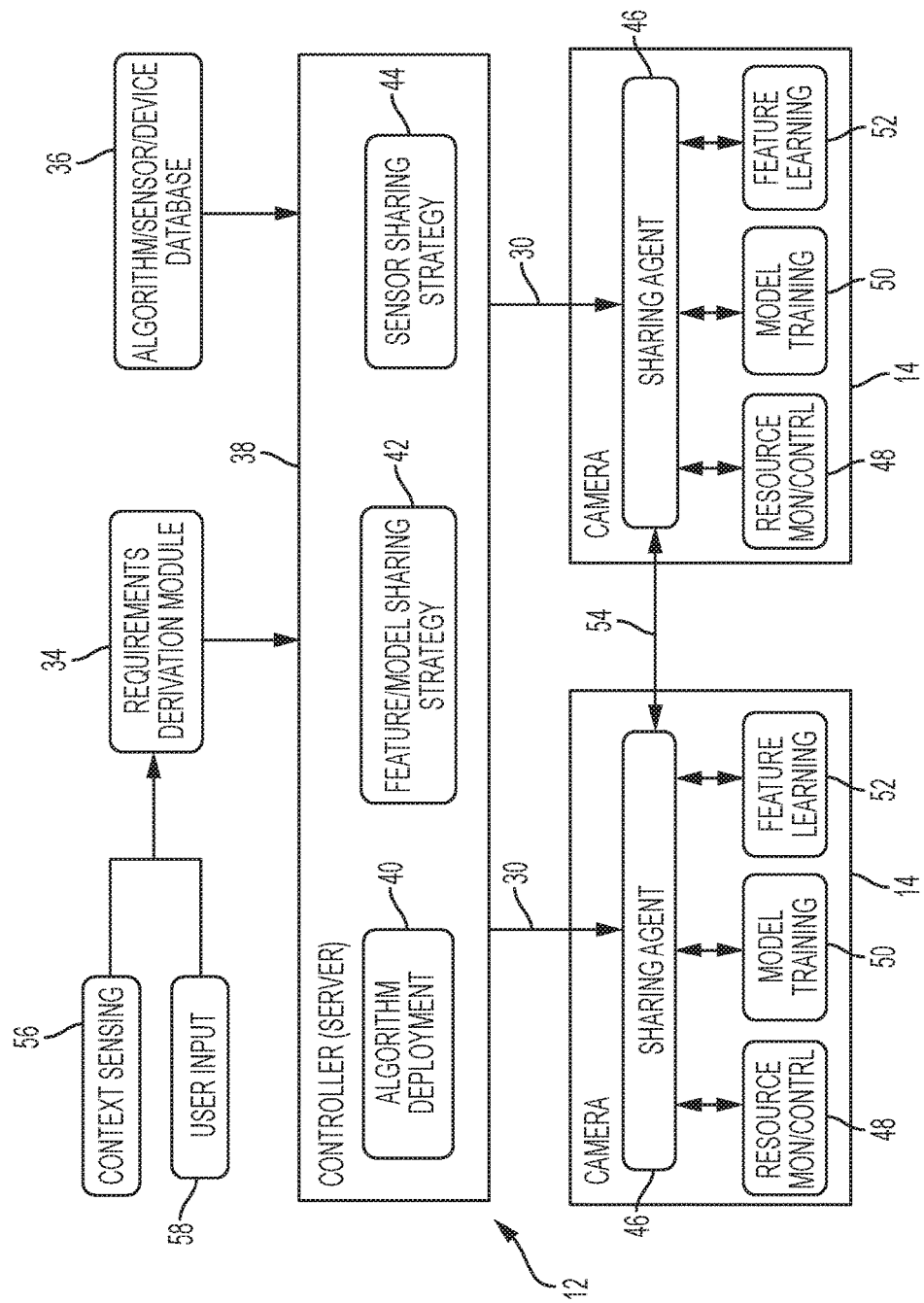
FIG. 2 illustrates in further detail the system of FIG. 1 for dynamic deployment of an optimized recognition deployment strategy in distributed camera devices, according to an example embodiment.

FIG. 2 illustrates in further detail the controller device 12 and the distributed camera devices 14 of FIG. 1 for dynamic deployment of an optimized recognition deployment strategy in distributed camera devices, according to an example embodiment. The controller device 12 of FIG. 2 can be implemented in a single physical machine, or can be implemented using a plurality of physical machines that can communicate via different wired or wireless data links, as appropriate.

The controller device 12 (e.g., 12a and/or 12b) can include a requirements derivation module 34, a database device 36, and a controller portion 38 comprising an algorithm deployment module 40, a feature/model sharing strategy module 42, and a sensor sharing strategy module 44. The controller device 12 also can include a context sensing module 56, and an input interface 58 for receiving user inputs from an administrator via the client device 20.

Each distributed camera device 14 can include a sharing agent module 46, a resource monitor/control module 48, a model training module 50, and a feature learning module 52. As described below, the sharing agent modules 46 in different distributed camera devices 14 can share sensor data, recognition features, and/or recognition models via a peer data link 54.

The requirements derivation module 34 is configured for determining video recognition requirements (60 of FIG. 3A) for a particular video recognition application (i.e., recognition use), for example in response to an identified event, or a prediction of an identifiable event based on, for example, a scheduling resource or a stochastic analysis using one or more probability distribution functions. The requirements derivation module 34 can determine the video recognition requirements 60 using, for example, inputs from any one of a context sensing module 56 that detects and processes sensor data from physical sensors in the distributed camera system 10 (e.g., interpreting temperature sensor data as fire alarm data, interpreting lighting changes in image data as person entering a room, motion-sensed data as beginning a manufacturing process, etc.), and/or a user input interface 58 that can receive inputs from the client device 20 for a video recognition application requested by the administrator. As illustrated in FIG. 1, different objects 100 may need to be detected and/or recognized, for example a person 100a, or a fire 100b, etc.

Hence, the requirements derivation module 34 is configured for determining current and/or future video recognition requirements for a video recognition application, or a video recognition use, including the requirement attributes as described in further detail below with respect to FIGS. 3A, 3B, and 5. Hence, the video recognition requirements 60 define the "type" of video recognition that is required, and the associated attributes of the video recognition "type": example types of video recognition requirements are illustrated in FIG. 3B as real-time gesture detection 60a, real-time feature matching (e.g., of prescribed objects, facial recognition, vehicle type matching, etc.) 60b, offline facial recognition 60c, real-time intruder detection 60d, etc.; other video recognition requirements 60 can include real-time motion tracking, image correlation between two images, image detail correction or enhancement, image color correction/enhancement, etc.; other video recognition requirements 60 can include whether the video recognition application is localized to a specific detection zone 26, or whether one or more types of sharing is required between different distributed camera devices 14 among the respective sharing agent modules 46 via their peer data links 54.

Figure 3A:
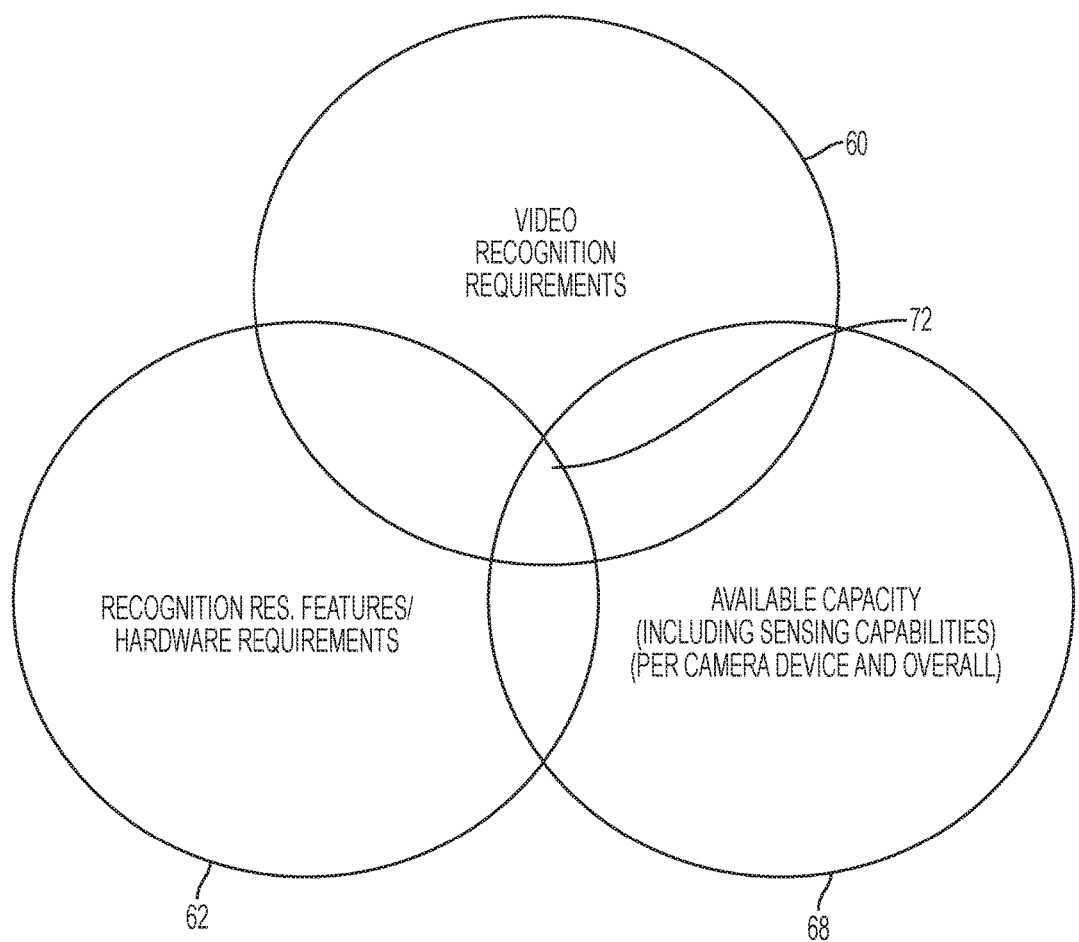
FIGS. 3A and 3B illustrate example attributes used by the apparatus of FIG. 1 or 2 for dynamic deployment of an optimized recognition deployment strategy in distributed camera devices, according to an example embodiment.
Figure 3B:
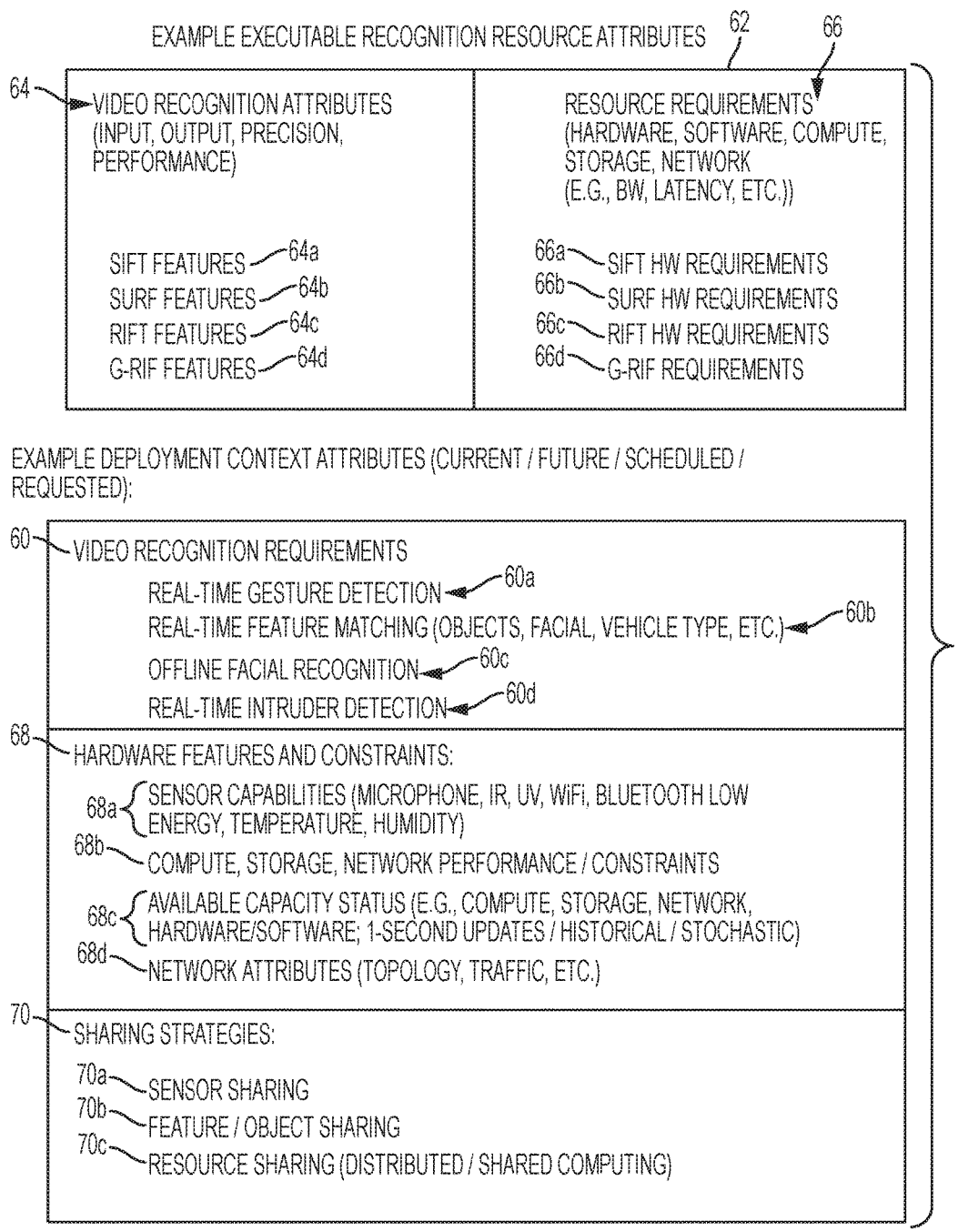

The controller portion 38 is configured for storing in the database device 36 a collection of collection of executable video-based executable recognition resources, referred to also as the "algorithm database": the algorithm database can include the executable code required for deployment of the executable video-based executable recognition resources, or at least an identifier (e.g., a Universal Resource identifier) for locating the corresponding executable code; the algorithm database in the database device 36 also can store the associated recognition algorithm characteristics and requirements (62 of FIGS. 3A and 3B). As illustrated in FIG. 3B, the recognition algorithm characteristics and requirements 62 can include video recognition attributes 64 that describe a recognition type (e.g., specifying input type and output type), and various performance metrics such as precision, throughput, etc.); as illustrated in FIG. 3B, the recognition algorithm characteristics and requirements 62 can include associated attributes for different available executable recognition resources, for example attributes 64a for SIFT, attributes 64b for SURF, attributes 64c for Rotation-Invariant Feature Transformation (RIFT), and/or attributes 64d for Generalized Robust Invariant Feature (G-RIF), etc.

The recognition algorithm characteristics and requirements 62 also can include associated resource requirements 66 for each of the available executable recognition resources identified in the controller portion 38, including hardware, software, compute, storage, and/or network requirements, where network requirements can include any network quality-based attribute such as bandwidth, latency, quality of service (QoS), link/network/transport layer protocol type, etc.; the resource requirements 66 also can specify whether sharing is required for a distributed deployment context (e.g., sharing sensor data of same or different types from different distributed camera devices 14, etc.). Hence, the resource requirements 66 can include the resource requirements 66a for SIFT, resource requirements 66b for SURF, resource requirements 66c for RIFT, resource requirements 66d for G-RIF, etc.

The controller portion 38 also is configured for storing in the database device 36 a sensor/device database that identifies the "available capacity" (68 of FIG. 3A) of each distributed camera device 14 and of the distributed camera system 10 overall. As used herein, the term "available capacity" 68 includes all hardware and software features and constraints implemented in each distributed camera device 14, and as deployed as a whole in the distributed camera system 10. As illustrated in FIG. 3B, the available capacity 68 can include an identification of sensing capabilities 68a for each distributed camera device 14 (or any stand-alone sensor device), including for example an identification of whether a given distributed camera device 14 includes sensing capabilities such as a microphone for sound detection, infrared (IR) sensor for IR images, a Wi-Fi transceiver for wireless Wi-Fi communications and/or Wi-Fi signal characteristics detection, Bluetooth Low-Energy (BLE) for wireless BLE communications and/or BLE signal characteristics detection, a temperature sensor for temperature detection, a hygrometer for humidity detection, etc.

The available capacity 68 also can include, for each distributed camera device 14 (or any stand-alone sensor device), an identification of all compute, storage, network performance or constraints attributes 68b, including for example device model name (including specifications), processor type and specifications, memory type and specifications, device interface type and specifications, etc. The available capacity 68 also can include, for each distributed camera device 14 (or any stand-alone sensor device) an available capacity status 68c that specifies the "available for execution" status (e.g., free resources, etc.) in each distributed camera device 14 or stand-alone sensor device, including an identification of any incompatibility between different available executable recognition resources.

The available capacity 68 also an include network attributes 68d describing characteristics and conditions of the existing access network 16, including for example network topology (including identification of the logical network position of each distributed camera device 14 or stand-alone sensor device within the access network 16), and/or network traffic attributes.

The deployment context (comprising the video recognition requirements 60 and the available capacity 68) also can include sharing strategies 70, including for example a sensor sharing strategy 70a, a feature/model sharing strategy 70b, and a resource sharing strategy 70c for distributed or shared computing. The sharing strategies 70 can based on an identified need in the video recognition requirements 60 for distributed video recognition among multiple distributed camera devices 14 (e.g., based on simultaneous analysis of different images at respective detection zones 26), an identified need for sensor sharing (where sensor data from one device is forwarded to a distinct distributed camera device 14 for optimized recognition using the sensor data), feature/object sharing (where a feature or object determined from execution of a recognition resource is shared with another distinct distributed camera device 14 for coordinated optimized recognition using the shared feature or object), or resource sharing (whether distributed computing is needed for distributed recognition, or if a first distributed camera device (e.g., 14a) shares resources with a second distributed camera device (e.g., 14b) having insufficient resources to fully execute a recognition operation).

Hence, the controller portion 38 can store in the database device 36 any of the attributes of a deployment context under analysis, including a current or future deployment context, or a predicted deployment context, including the video recognition requirements 60, the available capacity 68, and optionally the sharing strategies 70.

The algorithm deployment module 40 is configured for determining an optimized recognition deployment strategy (72 of FIG. 3A) for a determined deployment context, the optimized recognition deployment strategy 72 illustrated in FIG. 3A as the intersection between the video recognition requirements 60 for a video recognition application, the recognition algorithm characteristics and requirements 62 of the available executable recognition resources, and the available capacity 68 (including sharing strategies 70) of the distributed camera devices 14 and the distributed camera system 10 generally. As described in further detail below with respect to FIG. 5, the algorithm deployment module 40 can identify one or more optimized executable recognition resources for execution in one or more distributed camera devices 14 based on the deployment context, and can send instructions to the distributed camera device 14 for dynamic deployment of the optimized recognition deployment strategy 72 based on the distributed camera devices 14 executing the optimized executable recognition resources on the image data, with optional sharing strategies 70 coordinated by the feature/model sharing strategy module 42 and/or the sensor sharing strategy module 44.

The feature/model sharing strategy module 42 is configured for establishing feature/object/model sharing strategies 70b that enable the sharing agent modules 46 in the distributed camera devices 14 to share determined recognition features, objects, and/or models, for example using "crowdsourcing" approach, where a sharing agent module 46 of a distributed camera device 14 can advertise requests for identifiable recognition features, objects, and/or models via the peer data link 54, enabling other distributed camera devices 14 to share their recognition features, objects, and/or models with the requesting distributed camera device 14. Similarly, the sensor sharing strategy module 44 is configured for establishing sensor sharing strategies 70a that enable the distributed camera devices 14 to utilize the "crowdsourcing" approach for obtaining various sensor data from other distributed camera devices 14.

As illustrated in FIG. 2, each distributed camera device 14 can include a resource monitor/control module 48, a model training module 50, and a feature learning module 52. The resource monitor/control module 48 can be configured for performing monitoring of available device resources in the corresponding distributed camera device 14, including sending a real-time status update (e.g., periodically every second, or in response to a request) of the available capacity status 68c of the distributed camera device 14. The model training module 50 can be configured for executing local recognition "learning" techniques associated with identifying a recognition model, and the feature learning module 52 can be configured for executing local recognition "learning" techniques associated with identifying a recognition feature, for local optimization of recognition techniques by the corresponding distributed camera device 14.

Figure 4:
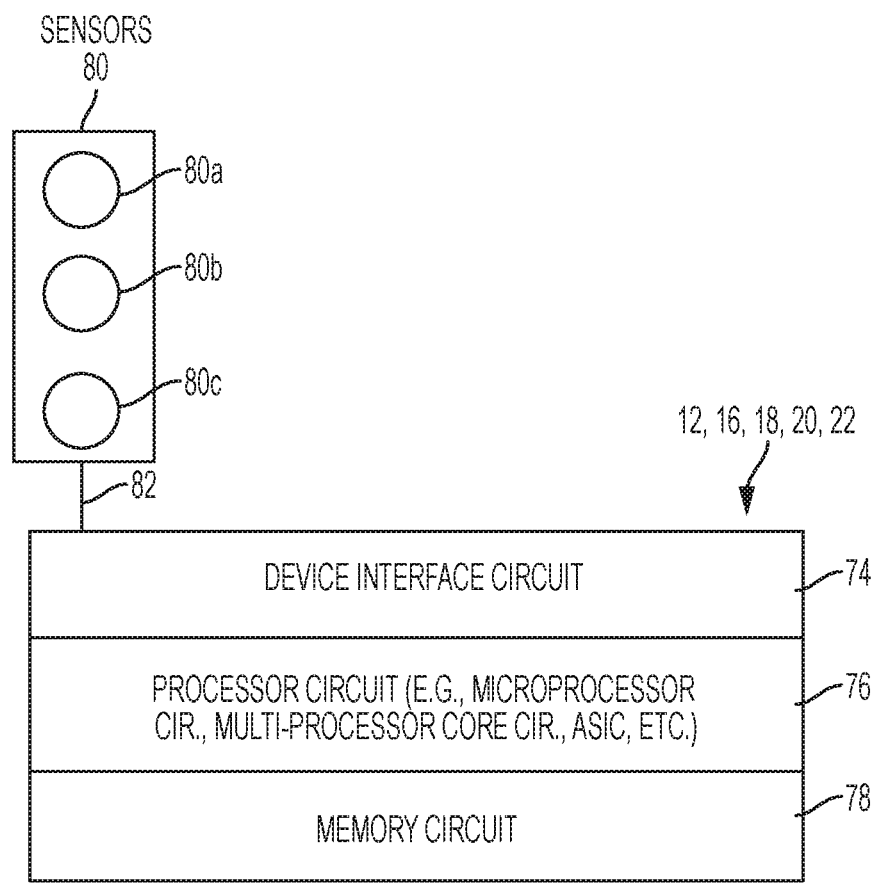
FIG. 4 illustrates an example implementation of any apparatus of FIG. 1 or 2, according to an example embodiment.

FIG. 4 illustrates an example implementation of any one of the devices 12, 14, 18, 20, 22 of FIG. 1, according to an example embodiment. FIG. 4 also illustrates an example implementation of any of the devices 34, 36, 38, 40, 42, 44, 56, and 58 of FIG. 2 if the controller device 12 is deployed in a distributed architecture using discrete network-based devices, according to an example embodiment. For sake of simplicity, the description with respect to FIG. 4 will be with respect to the devices 12, 14, 18, 20, 22 of FIG. 1, with the understanding that the description with respect to FIG. 4 can be equally applicable to any of the devices 34, 36, 38, 40, 42, 44, 56, and 58 of FIG. 2.

Each apparatus 12, 14, 18, 20, 22 of FIG. 1 (and/or a stand-alone sensor device in the distributed camera system 10) can include a device interface circuit 74, a processor circuit 76, and a memory circuit 78. The device interface circuit 74 can include one or more distinct physical layer transceivers for communication with any one of the other devices 12, 14, 18, 20, 22 of FIG. 1 (or any other stand-alone sensor device in the distributed camera system 10); the device interface circuit 74 also can include an IEEE based Ethernet transceiver for communications with the devices of FIG. 1 via any type of data link (e.g., a wired or wireless link, an optical link, etc.). The processor circuit 76 can be configured for executing any of the operations described herein, and the memory circuit 78 can be configured for storing any data or data packets as described herein.

FIG. 4 also illustrates that at least a distributed camera device 14 (and a stand-alone sensor device) can include one or more sensors 80, for example a camera (including lens and/or photosensitive diode array) 80a, an infrared array 80b, a microphone 80c, etc., that can have a local wired or wireless data link 82 with the device interface circuit 74 (e.g., BLE, USB, HDMI, etc.). As described previously, different distributed camera devices 14 or stand-alone sensor devices (or any other device disclosed herein) can have different types of sensors 80.

Any of the disclosed circuits of the devices 12, 14, 18, 20, 22 of FIG. 1, or any other stand-alone sensor device (including the device interface circuit 74, the processor circuit 76, the memory circuit 78, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 78) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 78 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 78 can be implemented dynamically by the processor circuit 76, for example based on memory address assignment and partitioning executed by the processor circuit 76.

Figure 5:
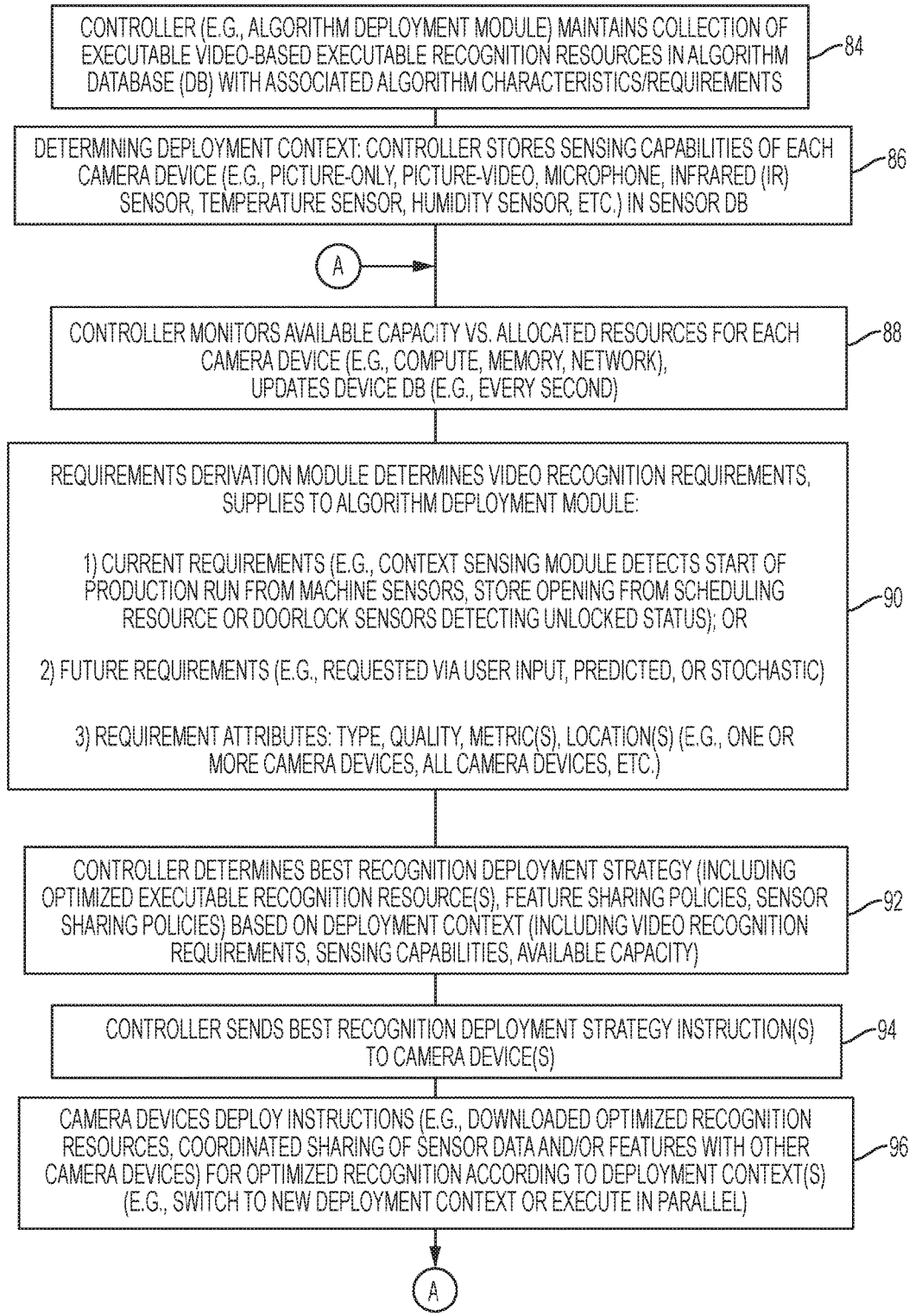
FIG. 5 illustrates an example method, by the apparatus of FIGS. 1 and 2, of executing dynamic deployment of an optimized recognition deployment strategy in distributed camera devices, according to an example embodiment.

FIG. 5 illustrates an example method, by the apparatus of FIGS. 1 and 2, of executing dynamic deployment of an optimized recognition deployment strategy in distributed camera devices, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

As described previously, the controller portion 38 (e.g., the processor circuit 76 executing the algorithm deployment module 40) in operation 84 can maintain in the database device 36 a collection of the executable video-based executable recognition resources in the algorithm database, including the associated recognition algorithm characteristics and requirements 62 such as the video recognition attributes 64 and the resource requirements 66 illustrated in FIG. 3B. The recognition algorithm characteristics and requirements 62 (including the video recognition attributes 64 and/or the resource requirements 66) also can be added to the algorithm database in the database device 36 by an administrator via the client device 20, enabling the processor circuit 76 executing the algorithm deployment module 40 to identify an optimized deployment strategy 72, depending on the requirements of the deployment context.

The processor circuit 76 executing the requirements derivation module 34 (or the algorithm deployment module 40, as appropriate) in operation 86 can begin identifying the deployment context, which describes the video recognition requirements 60 for the particular video recognition application to be applied to the images detected by the distributed camera devices 14, relative to the available capacity 68 of the distributed camera devices 14 and the distributed camera system 10 overall. In particular, the processor circuit 76 executing the requirements derivation module 34 (or the algorithm deployment module 40, as appropriate) in operation 86 is configured for storing the sensing capabilities 64*a* of each distributed camera device 14 in the sensor database stored in the database device 36, enabling an identification of the "sensor inventory" available for determination of the optimized recognition deployment strategy 72. Hence, the storing of the sensing capabilities 64*a* enables determining the video recognition requirements 60 based on the sensing capabilities of any one or more of the distributed camera devices 14, or any of the stand-alone sensor devices deployed in the distributed camera system 10; as described storing of sensing capabilities 68*a* enables the algorithm deployment module 40 to determine if a sharing strategy is needed, for example sensor sharing, feature sharing, model sharing, resource sharing, etc.

The processor circuit 76 executing the requirements derivation module 34 (or the algorithm deployment module 40, as appropriate) in operation 88 is configured for monitoring the available capacity status 68*c* (versus allocated resources) for each distributed camera device 14, including for example compute, memory, and network capacity for the corresponding processor circuit 76, memory circuit 78, and device interface circuit 74 of each distributed camera device 14, and updating the device database in the database device 36 accordingly, for example on a per-second basis; the processor circuit 76 executing the requirements derivation module 34 also can use predictive techniques (e.g., based on scheduled events, historical trends, stochastic distributions identifying probabilities of identifiable events) for storing predicted capacity status in the device database in the database device 36.

The processor circuit 76 executing the requirements derivation module 34 (or the algorithm deployment module 40, as appropriate) in operation 90 can further continue identifying the deployment context based on determining the video recognition requirements 60 for the video recognition application needed to be applied to the image/video data captured by one or more of the distributed camera devices 14. For example, the processor circuit 76 executing the requirements derivation module 34 can determine the video recognition requirements 60 in response to receiving a user request, via the input interface 58, from an administrator using the client device 20 that specifies a particular video recognition application for immediate deployment or at a future specified time or event (e.g., start real-time intruder detection at end of evening production run); the processor circuit 76 executing the requirements derivation module 34 also can detect the current requirements in response to the context sensing module 56 detecting an identified event from a sensor device, for example from a detected machine sensor indicating a start of a production run, a door lock sensor detecting an unlocked status indicating a retail store opening when the storefront door is unlocked for business, etc.

The processor circuit 76 executing the requirements derivation module 34 (or the algorithm deployment module 40, as appropriate) in operation 90 also can determine future video recognition requirements 60, for example in response to the input interface 58 receiving a request for executing an optimized recognition for an identified future event; as described previously, the requirements derivation module 34 also can predict an identified future event based on, for example, a scheduling resource or a stochastic analysis using one or more probability distribution functions.

The processor circuit 76 executing the requirements derivation module 34 (or the algorithm deployment module 40, as appropriate), having determined in general the video recognition requirements 60 by application type, can identify the specific requirement attributes as required, including recognition type, recognition quality, recognition metrics (including real-time/throughput, offline/required recognition time, localized recognition using only one distributed camera device 14 vs. distributed recognition using plural distributed camera devices 14 or globally distributed recognition using all the distributed camera devices 14 in the distributed camera system 10, etc. The processor circuit 76 executing the requirements derivation module 34, can supply the video recognition requirements 60 and associated attributes to the algorithm deployment module 40 for determination of the optimized recognition deployment strategy 72.

The processor circuit 76 executing the algorithm deployment module 40 in operation 92 determines the optimized recognition deployment strategy 72, from the available deployment strategies, based on the deployment context (including the video recognition requirements 60 relative to the available capacity 68) relative to the recognition algorithm characteristics and requirements 62. As described in further detail below, the processor circuit 76 executing the algorithm deployment module 40 also can coordinate with the feature/model sharing strategy module 42 and the sensor sharing strategy module 44 to determine the optimized sharing strategies 70*a*, 70*b*, and/or 70*c*.

For example, the algorithm deployment module 40 in operation 92 can determine the optimized recognition deployment strategy 72 based on video recognition requirements 60, the available capacity 68*c* in each distributed camera device 14, the recognition algorithm characteristics and requirements 62, and the sharing strategies 70*a*, 70*b*, and/or 70*c*. In particular, the algorithm deployment module 40 determines, for each available executable recognition resource in the database device 36, the similarity between the video recognition requirements 60 requirement (the "user requirement") and the corresponding characteristic 64; the similarity can be defined by $1/(\sum |u_i - d_i| + 1)$, $u_i \ne \text{null}$, where $u_i$ denotes the ith metric in the user requirement, and $d_i$ denotes the corresponding characteristic of the ith metric in the recognition algorithm characteristics and requirements 62. The numeric values of both $u_i$ and $d_i$ can be $-1$, $0$, and $1$, providing for example a low/medium/high value of the corresponding metric.

Hence, the available executable recognition resource determined by the algorithm deployment module 40 as having the largest similarity to the user requirement, as specified in the video recognition requirements 60, is determined by the algorithm deployment module 40 to be the optimized executable recognition resource to be executed in the corresponding distributed camera device 14, according to the deployment context.

If the algorithm deployment module 40 determines in operation 92 that the optimized executable recognition resource for each of the distributed camera device 14 have a high correlation of satisfying the video recognition requirements 60, i.e., the similarity is 1, then the deployment strategy is complete. If, however, the algorithm deployment module 40 determines there is not a high correlation for each distributed camera device 14, then for each distributed camera device 14*i* (i=1 to n) where the video recognition requirements 60 requirements are not met with a high correlation, the algorithm deployment module 40 can identify potential sharing strategies 70. For example, for each of the unsatisfied metrics associated with a distributed camera device 14*i*, the algorithm deployment module 40 can search neighboring distributed camera devices near the distributed camera device 14*i*, and determine whether any neighboring camera devices have the same features which meet the requirements of the distributed camera device 14*i*; if one or more neighboring camera devices (e.g., 14*b*) have the same features meeting the requirements of the distributed camera device under analysis (e.g., 14*i*=14*a*), the algorithm deployment module 40 can select the distributed camera device 14*b* which can share the most similar view to the distributed camera device 14*a*.

Hence, in response to the processor circuit 76 of the algorithm deployment module 40 in operation 94 sending its recognition deployment strategy instructions to the distributed camera devices 14 (including distributed camera device 14*a* and distributed camera device 14*b*), such as identifying the optimized executable recognition resource for execution, the relevant sharing strategies 70, etc., the processor circuit 76 in the distributed camera devices 14 in operation 96 can execute the instructions for deploying the optimized recognition deployment strategy 72, including downloading the optimized executable recognition resources from the algorithm database in the database device 36, implement the sharing strategies 70, for optimized recognition according to the deployment context. For example, the distributed camera device 14*a* can send a request to the distributed camera device 14*b* for corresponding recognition features. In one example, considering the set of requirements for different metrics, SURF can be selected as the optimized executable recognition resource for deployment in the distributed camera device 14*a*; although SURF has the largest similarity to the requirements of the distributed camera device 14*a*, SURF does not meet the precision requirement; hence, the sharing agent module 46 of the distributed camera device 14*a* can request from the sharing agent module 46 of the distributed camera device 14*b* for the relevant SIFT features, enabling SURF and SIFT features to be utilized by the executable recognition resources in the distributed camera device 14*a*.

The sharing strategies 70 deployed within the distributed camera devices 14 enable a peer-based request for sharing of sensor data. For example, if after leveraging the features of nearby cameras, the distributed camera device 14*a* still cannot completely meet its requirements, then the sharing agent module 46 executed in the distributed camera device 14*a* can output a query on the peer data link 54 to determine whether other distributed camera devices 14 within a predefined distance can share sensor data to assist the distributed camera device 14*a* in meeting its requirements. Although the sensors 80 are located in other distributed camera devices 14, the sensor data can be associated with the captured video of the distributed camera device 14*a* if the associated distributed camera devices 14 are within a reasonable distance.

For example, the distributed camera device 14*a* can query the sensor database in the database device 36 for sensors 80 within a prescribed distance; the distance can vary for different metrics. The sharing agent module 46 in the distributed camera device 14*a* can send a request for the algorithm deployment module 40 to recalculate the best recognition resource, based on applying sensor sharing 70*a* relative to the sensors 80 discovered by the distributed camera device 14*a* within the prescribed distance from the sensor database. In response to the algorithm deployment module 40 receiving the updated context identifying the available nearby sensors in the available capacity 68, the algorithm deployment module 40 can determine in operation 92 a second (alternative) optimized executable recognition resource for execution by the distributed camera device 14*a*, and send to the distributed camera device 14*a* in operation 94 a second instruction for deployment and execution of the second (alternative) optimized execution resource, along with and identification of the sensor sharing policy 70*a* identifying the available nearby sensors, enabling the distributed camera device 14*a* to execute the second (alternative) optimized execution resource using the sensor data from the available nearby sensors retrieved by the corresponding sharing agent module 46.

Hence, the second instruction enables the distributed camera device 14*a* to switch from the first optimized recognition according to the deployment context (without having access to the sensor data from the available nearby sensors) to the optimized recognition according to the second deployment context (using the second (alternative) optimized execution resource in combination with the sensor data from the available nearby sensors). The switching also can be applicable to the above-described feature sharing or object sharing. Also note that in some examples a distributed camera device 14 can be configured for concurrently executing two optimized execution resources for respective deployment contexts, assuming the distributed camera device 14 has sufficient processing capacity.

According to example embodiments, an optimized recognition deployment strategy can be dynamically determined and deployed among distributed camera devices, based on identifying changing requirements with respect to image or video recognition requirements for a given recognition application, relative to the available capacity of the distributed camera devices. The example embodiments enable, as part of the optimized recognition deployment strategy, an identification of optimized executable recognition resources for the different distributed camera devices, and sharing strategies that enable the distributed camera devices to share recognition features or recognition objects (obtained during execution of recognition operations on acquired images), share sensor data, or share resources for distributed computing.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by an apparatus in a data network, a deployment context for execution within one or more distributed camera devices in a distributed camera system, including determining, for the deployment context, available capacity in the one or more distributed camera devices, and determining video recognition requirements for the deployment context, the deployment context based on the video recognition requirements relative to the available capacity;
   determining an optimized executable video recognition resource for the deployment context from available executable recognition resources, including determining the optimized executable video recognition resource as at least a part of a best match for the video recognition requirements within the available capacity; and
   sending, to the one or more distributed camera devices via the data network, an instruction for deployment and execution of the optimized executable video recognition resource for optimized recognition according to the deployment context.

2. The method of claim 1, further comprising:
identifying a second deployment context, distinct from the deployment context, for execution within at least the one or more distributed camera devices;
determining a second optimized executable recognition resource for the second deployment context; and
sending, to the one or more distributed camera devices, a second instruction for deployment and execution of the second optimized executable recognition resource for optimized recognition according to the second deployment context, distinct from the deployment context.

3. The method of claim 2, wherein the second instruction enables the one or more distributed camera devices to switch from the optimized recognition according to the deployment context to the optimized recognition according to the second deployment context.

4. The method of claim 2, wherein the identifying the second deployment context is based on at least one of:
a user request for executing the optimized recognition for an identified event;
predicting the identified event; or
detection of the identified event by a sensor device.

5. The method of claim 1, wherein the determining of the deployment context includes:
determining the video recognition requirements for an identified event detectable by the one or more one or more distributed camera devices; and
determining the available capacity based on at least one of sensing capabilities or allocated resources in the one or more distributed camera devices.

6. The method of claim 5, wherein:
the determining the optimized executable video recognition resource includes determining a sensor sharing policy enabling a first of the one or more distributed camera devices to share sensor information with a second of the distributed camera devices, based on the first and second distributed camera devices having different sensing capabilities;
the sending including sending, to the first and second distributed camera devices, the sensor sharing policy for the optimized recognition based on the first and second distributed camera devices sharing the sensor information.

7. The method of claim 1, wherein:
the determining of the optimized executable video recognition resource includes determining a feature sharing policy enabling a first of the one or more distributed camera devices to share a recognition feature with a second of the distributed camera devices, the recognition feature determined in response to the first distributed camera device executing the optimized executable video recognition resource on an image captured by the first distributed camera device;
the sending including sending, to the first and second distributed camera devices, the feature sharing policy enabling the first distributed camera device to share the recognition feature with the second distributed camera device.

8. The method of claim 7, wherein:
the instruction is sent to the first distributed camera device;
the determining of the optimized executable video recognition resource includes determining a second optimized executable recognition resource for execution by the second distributed camera device;
the sending includes sending a second instruction, to the second distributed camera device, for deployment and execution of the second optimized executable resource by the second distributed camera device for the optimized recognition according to the deployment context based on the feature sharing policy.

9. An apparatus comprising:
a processor circuit configured for determining a deployment context for execution within one or more distributed camera devices in a distributed camera system, including determining, for the deployment context, available capacity in the one or more distributed camera devices, and determining video recognition requirements for the deployment context, the deployment context based on the video recognition requirements relative to the available capacity, the processor circuit further configured for determining an optimized executable video recognition resource for the deployment context from available executable recognition resources, including determining the optimized executable video recognition resource as at least a part of a best match for the video recognition requirements within the available capacity; and
a device interface circuit configured for sending, to the one or more distributed camera devices via a data network, an instruction for deployment and execution of the optimized executable video recognition resource for optimized recognition according to the deployment context.

10. The apparatus of claim 9, wherein the processor circuit is configured for: identifying a second deployment context, distinct from the deployment context, for execution within at least the one or more distributed camera devices;
determining a second optimized executable recognition resource for the second deployment context; and
causing the device interface circuit to send, to the one or more distributed camera devices, a second instruction for deployment and execution of the second optimized executable recognition resource for optimized recognition according to the second deployment context, distinct from the deployment context.

11. The apparatus of claim 10, wherein the second instruction enables the one or more distributed camera devices to switch from the optimized recognition according to the deployment context to the optimized recognition according to the second deployment context.

12. The apparatus of claim 10, wherein the processor circuit is configured for identifying the second deployment context based on at least one of:
a user request for executing the optimized recognition for an identified event;
the processor circuit obtaining a prediction predicting the identified event; or
the processor circuit receiving a message indicating detection of the identified event by a sensor device.

13. The apparatus of claim 9, wherein the processor circuit is configured for:
determining the video recognition requirements for an identified event detectable by the one or more one or more distributed camera devices; and
determining the available capacity based on at least one of sensing capabilities or allocated resources in the one or more distributed camera devices.

14. The apparatus of claim 13, wherein:
the processor circuit is configured for determining a sensor sharing policy enabling a first of the one or more distributed camera devices to share sensor information with a second of the distributed camera devices, based on the first and second distributed camera devices having different sensing capabilities;
the processor circuit configured for causing the device interface circuit to send, to the first and second distributed camera devices, the sensor sharing policy for the optimized recognition based on the first and second distributed camera devices sharing the sensor information.

15. The apparatus of claim 9, wherein:
the processor circuit is configured for determining a feature sharing policy enabling a first of the one or more distributed camera devices to share a recognition feature with a second of the distributed camera devices, the recognition feature determined in response to the first distributed camera device executing the optimized executable video recognition resource on an image captured by the first distributed camera device;
the processor circuit is configured for causing the device interface circuit to send, to the first and second distributed camera devices, the feature sharing policy enabling the first distributed camera device to share the recognition feature with the second distributed camera device.

16. The apparatus of claim 15, wherein:
the instruction is sent to the first distributed camera device;
the processor circuit configured for determining a second optimized executable recognition resource for execution by the second distributed camera device;
the processor circuit is configured for causing the device interface circuit to send a second instruction, to the second distributed camera device, for deployment and execution of the second optimized executable resource by the second distributed camera device for the optimized recognition according to the deployment context based on the feature sharing policy.

17. One or more non-transitory tangible media encoded with logic for execution by a machine and when executed by the machine operable for:
determining, by the machine in a data network, a deployment context for execution within one or more distributed camera devices in a distributed camera system, including determining, for the deployment context, available capacity in the one or more distributed camera devices, and determining video recognition requirements for the deployment context, the deployment context based on the video recognition requirements relative to the available capacity;
determining an optimized executable video recognition resource for the deployment context from available executable recognition resources, including determining the optimized executable video recognition resource as at least a part of a best match for the video recognition requirements within the available capacity; and
sending, to the one or more distributed camera devices via the data network, an instruction for deployment and execution of the optimized executable video recognition resource for optimized recognition according to the deployment context.

18. The one or more non-transitory tangible media of claim 17, further operable for:
identifying a second deployment context, distinct from the deployment context, for execution within at least the one or more distributed camera devices;
determining a second optimized executable recognition resource for the second deployment context; and
sending, to the one or more distributed camera devices, a second instruction for deployment and execution of the second optimized executable recognition resource for optimized recognition according to the second deployment context, distinct from the deployment context.

19. The one or more non-transitory tangible media of claim 17, wherein the determining of the deployment context includes:
determining the video recognition requirements for an identified event detectable by the one or more one or more distributed camera devices; and
determining the available capacity based on at least one of sensing capabilities or allocated resources in the one or more distributed camera devices.

20. The one or more non-transitory tangible media of claim 17, wherein:
the determining of the optimized executable video recognition resource includes determining a feature sharing policy enabling a first of the one or more distributed camera devices to share a recognition feature with a second of the distributed camera devices, the recognition feature determined in response to the first distributed camera device executing the optimized executable video recognition resource on an image captured by the first distributed camera device;
the sending including sending, to the first and second distributed camera devices, the feature sharing policy enabling the first distributed camera device to share the recognition feature with the second distributed camera device.

* * * * *